Jan. 5, 1960 R. L. PLOUFFE, JR 2,920,142

PULSE COMMUNICATION SYSTEM

Filed June 6, 1955 3 Sheets-Sheet 1

INVENTOR
ROBERT L. PLOUFFE, JR.
BY Alfred C. Hill
AGENT

INVENTOR
ROBERT L. PLOUFFE, JR.
BY Alfred C. Hill
AGENT

INVENTOR
ROBERT L. PLOUFFE, JR
BY Alfred C. Hill
AGENT

United States Patent Office 2,920,142

Patented Jan. 5, 1960

2,920,142

PULSE COMMUNICATION SYSTEM

Robert L. Plouffe, Jr., Livingston, N.J., assignor to International Telephone and Telegraph Corporation, Nutley, N.J., a corporation of Maryland Application June 6, 1955, Serial No. 513,468

21 Claims. (Cl. 179—15)

This invention relates to pulse communication systems and more particularly to improved pulse generating means for multichannel pulse time modulation (PTM) communication systems.

An object of this invention is to provide an improved pulse generator including a marker pulse generator which occupies a minimum of space, is suitable for printed circuit wiring, requires substantially no external power sources, other than that of the signal source and requires only a minimum of maintenance.

Another object of this invention is to provide an improved marker pulse generator and improved channel modulators of the same general composition for a multichannel PTM system including only passive circuit elements. The term, "passive circuit elements" employed herein is to be understood to mean, those elements that require no power to be supplied to them other than the signal power.

Still another object of this invention is to provide a relatively simple circuit arrangement for generating the marker signal and the channel pulse signals directly from a sine wave signal.

A further object of this invention is to provide a common output impedance for the marker generator and the plurality of channel modulators of a multichannel communication system which shapes the half wave rectified signals coupled thereto into narrow pulse signals and interleaves these various pulse signals for formation of the PTM pulse train.

A feature of this invention is the provision of a circuit including a time constant network and a half wave rectifier to cooperatively produce from a sine wave signal a rectified signal having a sharp transition at the trailing edge thereof and a shaping circuit to produce from the sharp transition of said rectified signal a narrow pulse.

Another feature of this invention is the provision of a marker pulse generator of the double pulse type including a source of sine wave signal, a first circuit having a given time constant and including a half wave rectifier to produce a rectified signal therein having a sharp transition at the trailing edge thereof, a second circuit having a given time constant and including a half wave rectifier in parallel relation to said first circuit to produce a rectified signal therein having a sharp transition at the trailing edge thereof, means in combination with one of said circuits to produce a time displacement between the retified outputs of said first and second circuits, and a shaping circuit in common to the output of said first and second circuits to produce narrow pulses coincident with the sharp transition of each of the rectified signals.

Still another feature of this invention is the provision of a modulated pulse generator of the PTM type including a source of sine wave signal, a circuit having a given time constant including a half wave rectifier to produce from said sine wave signal a rectified signal having a sharp transition at a predetermined time position. A modulating signal is coupled to bias said rectifier in accordance with the amplitude of the modulating signal. This varying conduction of the rectifier results in a variation of the time position of said sharp transition. The rectified signal is differentiated to produce from said varying transition a narrow pulse whose time position is modulated in accordance with the amplitude of a signal of said modulating source.

A further feature of this invention is the provision of a marker generator and a plurality of modulator circuits as hereinabove described to generate a PTM pulse train including a marker signal and a plurality of channel signals wherein a shaping circuit is common to the marker generator and the plurality of channel signal modulators for producing the various pulse signals from the sharp transition of the rectified sine wave timing signals and simultaneously interleaves the various pulse signals to form the PTM pulse train.

The above mentioned and other features and objects of this invention will become more apparent by reference to the following description taken in conjunction with the accompanying drawings, in which.

Figure 1:
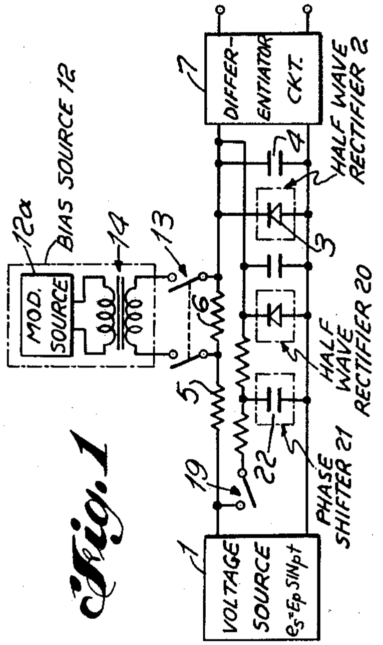
Fig. 1 is a schematic diagram, partially in block form, of a circuit illustrating the principle of this invention.

Referring to Fig. 1, the pulse generator of this invention, whether the output is modulated or unmodulated, is illustrated as comprising basically a sine wave source 1, a circuit including half wave rectifier 2, shown herein to include a crystal diode 3, and a time constant network including condenser 4 and resistors 5 and 6, and a differentiator circuit 7. The generator of pulses employing the above circuit components is accomplished by coupling the sine wave signals of source 1 to 2 by means of resistors 5 and 6. The application of sine wave signals, substantially as shown by curve 8 of Fig. 2, to rectifier 2 and the time constant network produces a series of rectified voltage waveforms as illustrated by curve 9 of Fig. 2 having a sharp transition at point 10. The reverse conduction of rectifier 2 lasts for a time corresponding to $\theta$, the nonconduction angle of rectifier 2. It will be observed that the leading portion of this rectified signal has a rounded transition, whereas the trailing portion has a sharp transition at point 10. When diode 3 is switched from forward to reverse conduction by the application of sine wave 8, a fast transition is not possible because of capacitor 4 being in parallel with diode 3. This accounts for the slow rise of the rectified signal. Capacitor 4 may be a physical capacitor connected in the circuit as shown, or it may represent the capacity present between the circuit components and ground, the circuit capacity, or a combination of both.

However, when diode 3 is switched from the reverse to the forward conduction by the decrease of sine wave signal, the diode impedance is low compared with that of capacitor 4 and a very sharp transition point is obtained. It will be further observed that the slope of the voltage waveform is greatest at a time equal to the non-conduction angle. Therefore, by feeding the rectified signal to a differentiator circuit 7 the rectified signal will be differentiated to produce a narrow pulse 11 coincident in time with the sharp transition 10 of curve 9.

The time position of pulse 11 may be modulated by varying the sharp transition point of the rectified signal, the non-conduction angle of diode 3. The variation of the non-conduction angle of diode 3 is accomplished by varying the bias thereof. In accordance with the circuit of Fig. 1, the bias source 12 for diode 3 is provided by modulation source 12a which is coupled in parallel to resistor 6 through means of transformer 14 by closing switch 13. As the amplitude of the modulation signal varies, diode 3 switches from its forward to reverse conduction condition sooner or later depending upon the polarity of the modulation signal. If the modulation signal is positive, the conduction condition of diode 3 will reverse sooner. Thus, the non-conduction angle of diode 3 will be longer as represented by waveform 15 of Fig. 2. If the modulation signal should be negative, the conduction condition of diode 3 will reverse later, thereby making the non-conduction angle of the diode 3 shorter as indicated by waveform 16 of Fig. 2. Differentiation of the rectified signals 15 and 16 result in modulated pulses 17 and 18, respectively. If transformer 14 is a step up-type transformer, the audio sensitivity of the modulation circuit will be increased by an amount equal to the voltage step up. The audio sensitivity of this modulation circuit is also a function of the slope of the sine wave signal near the zero axis crossing. The linearity of modulation will be a function of the linearity of the sine wave signal near the zero crossing. In a reduction to practice of the circuit of Fig. 1, it has been found experimentally that when using a 600 to 30,000 ohm audio transformer, a pulse deviation of one microsecond, and a sine wave signal voltage of 5.3 volts ms. at 15 kc., the audio power sensitivity of the modulator circuit is −21 dbm. It has also been found that the power required from source 1 is about 300 microwatts per channel when the circuit is employed in a multichannel communication system of the pulse time modulation type.

Figure 2:
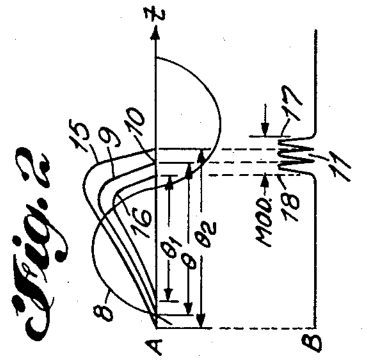
Figs. 2 and 3 are waveforms useful in explaining the operation in the circuit of Fig. 1.
Figure 3:
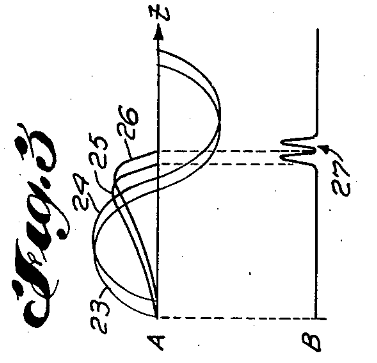

It is the usual practice in PTM communication systems to provide at the transmitter a marker generator to produce a marker signal which is utilized at the receiving end of the communication system to synchronize the receiver and demodulator circuits with the modulation circuits of the transmitter. The circuit of Fig. 1 may be modified by closing switch 19 thereby placing a second circuit including a time constant and half wave rectifier 20 in parallel with the first circuit including rectifier 2. Connected to the second circuit is a phase shifter 21 illustrated schematically as condenser 22. It is the purpose of phase shifter 21 to delay the sine wave applied to the second circuit arrangement a given amount to cause a time separation between the sine wave applied to rectifier 2 and the sine wave applied to rectifier 20 substantially as illustrated by curves 23 and 24 of Fig. 3. The action of rectifier 20 is identical to that of rectifier 2 as hereinabove described. The rectifiers of the parallel units produce rectified signals as illustrated in Fig. 2 by curves 25 and 26 having a sharp transition at the trailing edges thereof, the time that the diode rectifiers switch from their reverse conduction condition to their forward conduction condition. The application of these rectified signals to the common differentiator circuit 7 produces a pair of pulses, as indicated at 27 in Fig. 3, spaced from each other a predetermined amount as determined by phase shifter 21. The amount of time spacing between the pulses of the double pulse-type marker signal depends upon the value of the condenser 22. The time spacing may be manipulated by varying the value of condenser 22 to fit the application of the circuit to a particular PTM system specification.

Figure 4:
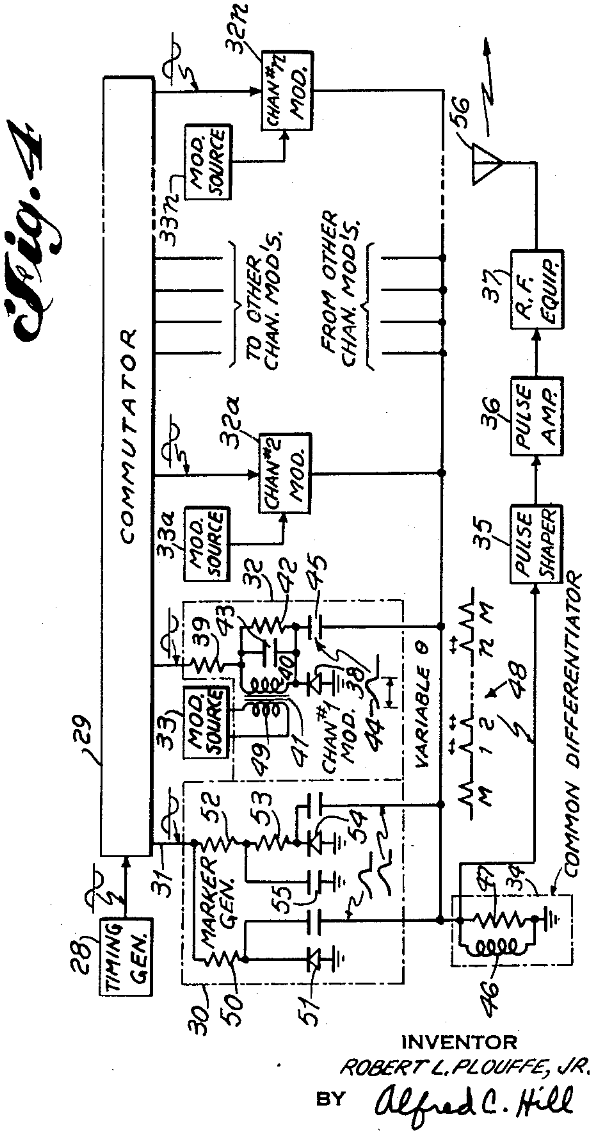
Fig. 4 is a schematic diagram, partially in block form, of a system incorporating embodiments of this invention.

Referring to Fig. 4, there is disclosed therein a PTM communication system modulation terminal utilizing practical embodiments of the circuit of Fig. 1 as the marker generator and channel modulator circuits therefor. The communication system includes a timing generator 28 having a sine wave output occurring at a desired repetition frequency. This sine wave signal is applied to commutator 29 which may be of the delay line type having spaced taps therealong to provide sufficient spacing between the channels of the communication system. The system further includes a marker generator 30 which modifies the sine wave signal at tap 31 to form a double pulse type marker or synchronizing signal and a plurality of channel modulators 32 responsive to the distributed or commutated sine wave signal for modification thereof in accordance with the intelligence coupled from modulation sources 33. In accordance with the principles of this invention, the half wave rectified outputs of the marker generator and the plurality of channel modulators are coupled to a common differentiator 34 for formation of the desired pulse signals and for interleaving of the channel pulse signals with the marker pulse signal to form the PTM pulse train. The formed pulse train is operated on in the common circuits of the terminal utilized to shape the various pulse signals and amplify the pulse signals prior to modulating the RF equipment for transmission to the receiving terminal or repeater stations of the communication system. The equipment common to the pulses of the formed pulse train are represented by the blocks 35, 36, and 37.

Each of the individual channel modulators receive sine wave signals from the appropriate tap of the commutator 29. The signal is applied to a germanium diode 38 through a resistor 39 and the high impedance winding 40 of an audio transformer 41. A resistor 42 provides a load for the audio transformer 41. The parallel arrangement of winding 40 and resistor 42 is bypassed by condenser 43. Diode 38 functions to provide a half wave rectified voltage thereacross, as indicated by curve 44, which is similar to curve 9 of Fig. 2. As mentioned hereinabove the diode 38 is switched from its forward to reverse conduction condition and a fast transition therein is not possible because of a time constant network associated therewith. In this instance the capacity of the time constant network is provided by the stray circuit capacitance in parallel relation with diode 38. However, when the diode switches from the reverse to the forward conduction condition, the diode impedance is low compared to that of the circuit capacitance and a very sharp transition point is obtained at the trailing edge of the rectified signal. Each of the channel modulators supply such a signal through a coupling capacitor, as indicated by capacitor 45 of modulator 32, to critically damped tuned circuit or differentiator circuit 34 including a toroid 46 in conjunction with the distributed capacitance thereacross shunted by a resistor 47 to produce a pulse at the point of the sharp transition. This differentiator or critically damped tuned circuit 34 is common to all of the channel modulators 32 and likewise to the marker generator 30. Thus, the common differentiator 34 shapes the half wave rectified signal to form a pulse signal at the point of sharp transition and interleaves these pulse signals to form a PTM pulse train as indicated by curve 48. In the case of the channel modulators, the pulse generated at the sharp transition of the half wave rectified signal is modulated in time by impressing an A.C. voltage from modulation source 33 on the primary winding 49 of the audio transformer 41. This is equivalent to placing a variable bias across diode 38 as hereinabove explained. Thus, the time at which the pulse occurs is caused to vary accordingly, that is, the time of sharp transition in the rectified signal is caused to vary in accordance with the bias placed on diode 38 by the modulating signals. The amount of voltage required for a given time displacement of the pulse is a function of the slope of the sine wave at the zero crossing. This slope is nearly constant for a sine wave near the zero crossing, and in fact, it departs from linearity by about 1/10 of 1 percent for a deviation of one microsecond at a 15 kc. repetition frequency.

In an actual reduction of practice, it has been experimentally determined that at a repetition frequency of 15 kc. and an amplitude of 5 volts r.m.s. and a 7–1 step up ratio for transformer 41, the required modulating voltage from source 33 is approximately 67.4 millivolts for a plus or minus one microsecond pulse deviation. The modulating power sensitivity for a 600 ohm line impedance is approximately 7.6 microwatts or −21 dbm. A greater sensitivity can be obtained for a given repetition frequency by reducing the sine wave voltage or using a higher transformer ratio. The first of these methods reduces the amplitude of the generated pulse and may cause poor signal to noise ratio. A higher transformer ratio may be used provided that the secondary impedance does not approach the magnitude of the back resistance of diode 38 for any operating temperature. With germanium point contact diodes, a 7–1 transformer ratio represents optimum design. However, gold bonded germanium diodes or silicon junction diodes with a higher back resistance may allow the use of a larger transformer ratio. It should be realized, however, that to affect a 6 db increase in the present modulator sensitivity, the transformer secondary impedance level would go up 4 times to 132,000 ohms. This would require a diode which could be depended upon to give a back resistance in excess of one megohm at normal equipment operating temperature.

A schematic diagram of marker generator 30, a companion to the channel modulators of Fig. 4, is illustrated as comprising essentially two channel modulator units including resistor 50 and diode 51 and resistors 52 and 53 and diode 54, respectively. These two units are fed in parallel from tap 31 of commutator 29 and their rectified outputs are fed to the common load or differentiator 34. The functioning of each of these units is substantially the same as described in connection with channel modulator 32 with the exception that there is no time modulation of the sharp transition of the rectified signal. There is provided a condenser 55 connected intermediate resistors 52 and 53 and coupled to ground. This condenser 55 provides sufficient phase shift of the sine wave signal applied to diode 54 so that the two generated pulses are spaced apart by a given time displacement. This time spacing may be adjusted to any desired value by selecting a predetermined value of capacitor. The double marker pulse is produced at the common load 34 by differentiation of the phase shifted rectified signal from each of the rectifier circuits, as indicated in curve 48 and is interleaved by differentiator 34 to form a portion of the pulse train applied to the common pulse train circuitry.

Figure 5:
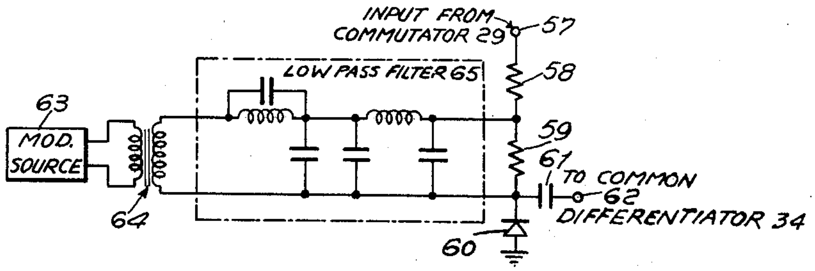
Figs. 5, 6, 7 and 8 are schematic diagrams of other embodiments following the principles of this invention.

Referring now to Fig. 5, there is disclosed therein another embodiment of the channel modulators which may be incorporated in the system of Fig. 4. The circuit arrangement of Fig. 5 represents an improvement over the circuit of Fig. 4 to meet certain rather stringent specifications of interference between the audio system and the output of the signal commutator. As in the previous embodiments the sine wave signal is fed from commutator 29 through terminal 57 via resistors 58 and 59 to be rectified by the diode rectifier 60 in conjunction with a time constant established in part by the stray circuit capacity. The rectified output is coupled through condenser 61 via terminal 62 to the common differentiator circuit 34 of Fig. 4. The conduction angle or sharp transition point is time modulated by the application of the modulating signal from source 63 through transformer 64 and low-pass filter 65 for biasing the rectifier 60 in accordance with the description hereinabove presented. By incorporating low-pass filter 65, the sine wave output from commutator 29 is blocked from entering or interfering with the modulation source 63. Thus, an isolation means is provided between the sine wave source and the modulating signal source which is important when certain sensitivity restrictions are placed upon the communication system of this invention. However, it is to be remembered that the system described in Fig. 4 is still operative where the specifications for the channel sensitivity is not stringent.

Figure 6:
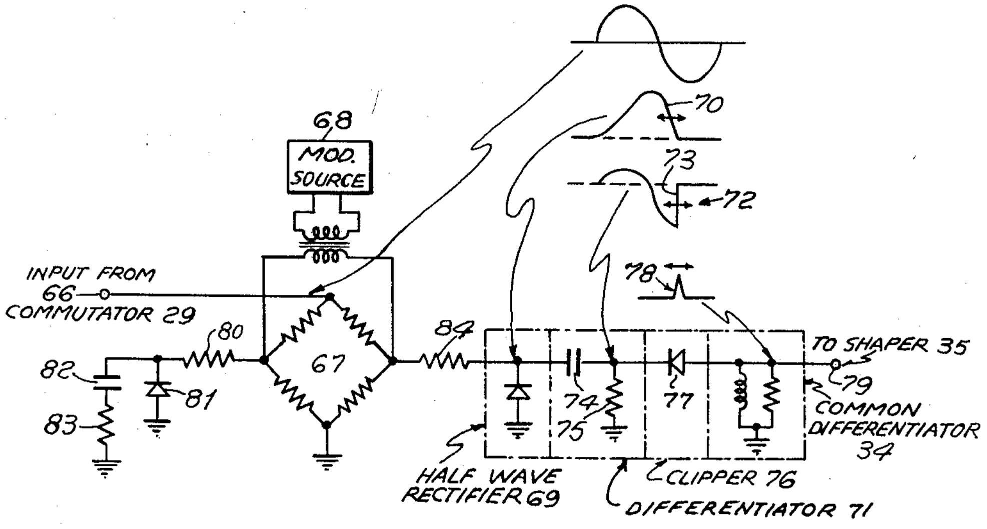

Fig. 6 illustrates another embodiment of channel modulators capable of utilization in the communication system of Fig. 4. Again this circuit provides a means of isolation between the audio source and the sine wave source. The signal isolation is provided by means of bridge 67 which has coupled across one pair of apexes thereof a sine wave signal of commutator 29 and across the other apexes thereof the modulating signal of source 68. With the bridge in balance, as is accomplished by employing identical resistors therein, the biasing of the half way rectifier 69 by modulating source 68 does not develop a voltage for transmission back through terminal 66 to the sine wave source, or a voltage for transmission back to source 68. As described hereinabove with reference to the other embodiments of this invention, the half wave rectifier produces a waveform as depicted in curve 70 whose trailing edge is modulated in accordance with the bias voltage supplied by modulating source 68. The waveform 70 is then coupled to a differentiator circuit 71 which produces a differentiated pulse as depicted in curve 72 having a sharp transition spike as indicated at 73. The differentiator 71 includes as components therein capacitor 74 and resistor 75 coupled from the capacitor to ground. The output developed across resistor 75, having the shape as indicated in curve 72, is coupled to a clipper 76 including a crystal diode 77. Crystal diode 77 clips the waveform 72 and enables the development of the modulated channel pulse 78 across the common differentiator circuit 34. The developed channel pulse 78 is interleaved with other channel pulses and the marker pulse in a multichannel communication system for application through terminal 79 to the common shaper circuit 35. To assure the maintenance of the balance of bridge 67 when the bias of rectifier 69 is varied, there is provided at the opposite portion of the bridge from the rectifier 69 an identical circuit arrangement to assure a continual balance in bridge 67 when the bridge is loaded down by the production of the channel pulse. This circuit arrangement to maintain the balance is indicated by resistor 80, diode rectifier 81, capacitor 82, and resistor 83 which have identical values as resistor 84, half wave rectifier 69, condenser 74, and resistor 75 in the operating portion of the channel modulator.

Figure 7:
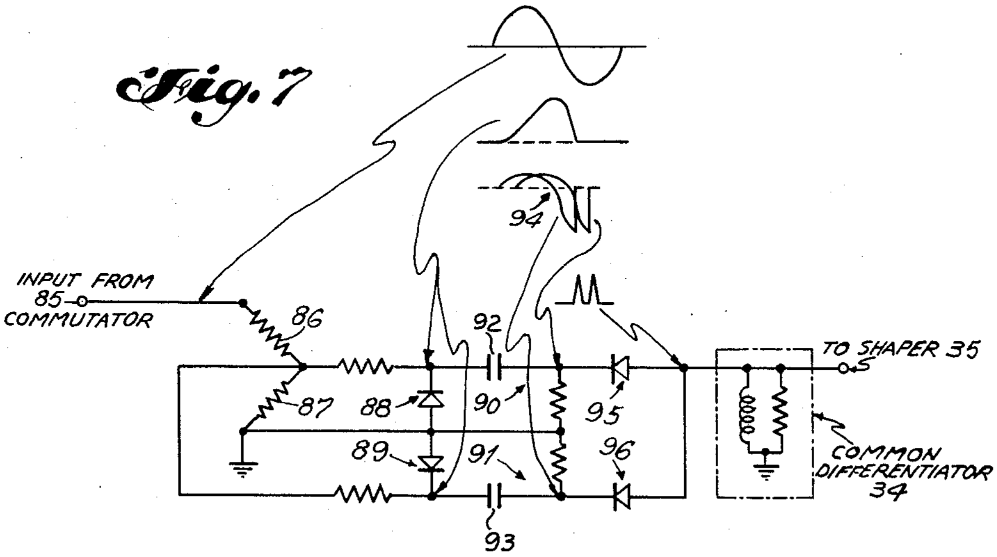

The schematic of Fig. 7 illustrates a companion marker generator circuit to be employed in conjunction with a communication system employing the channel modulators as depicted in Fig. 6 for the purpose of impedance matching of the marker generator and modulators to the commutator. The since wave input is applied at terminal 85 for coupling to the voltage divider including resistors 86 and 87. The sine wave voltage is coupled in parallel to two half wave rectifying units 88 and 89 from the junction of resistors 86 and 87 to produce the half wave rectified signal, as described hereinabove with reference to Fig. 1. The resultant half wave rectified signal is then coupled to the differentiator 90 and 91. The necessary phase shift between the outputs of the two half wave rectifiers 88 and 89 is obtained by employing predetermined different values for condensers 92 and 93. The resultant phase shift of the differentiated rectified output signals is indicated in curve 94. The resultant time displaced differentiated signals are then coupled through clippers 95 and 96 for application to the common differentiator or load circuit 34 for development of the desired double pulse type marker signal.

Figure 8:
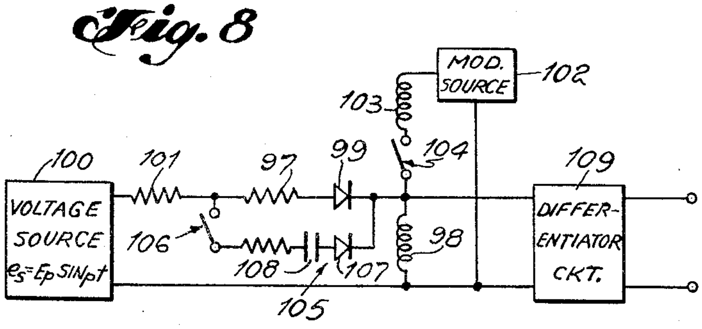
Figure 9:
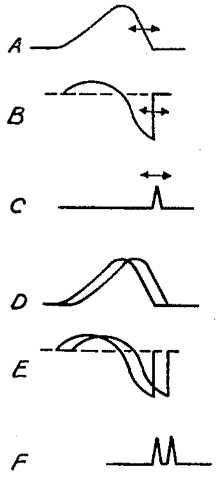
Fig. 9 are waveforms useful in explaining the operation of the circuit of Fig. 8.

By employing the principles of duality it is possible to derive from the circuits of Fig. 1, a dual as depicted in the circuit of Fig. 8. Thus, there is provided a resistor 97 and an inductance 98 in series with a crystal rectifier 99. If this R—L and series rectifier circuit is driven from a sine wave source 100, then the current in the loop, as produced by the voltage of source 100 and resistor 101, is a series of repeated transients with the approximate shape as shown in curve A of Fig. 9. The conduction of the current through the ideal rectifier 99 lasts for a time corresponding to $\theta$ which depends upon the $L/R$ time constant. The slope of the current wave form is greatest at a time equal to $\theta$ and is equal to zero for the maximum of the waveform. Therefore, the derivative of this waveform will have a sharp transient at time equal to $\theta$. The voltage across the inductor 98 will then exhibit the sharp transient, as indicated in curve B of Fig. 9 since it is proportional to the slope of the current waveform. If this waveform is further differentiated, a pulse will be obtained as is indicated in curve C of Fig. 9. As was the situation in the circuit of Fig. 1, and the further embodiments thereof, the time position of the pulse of curve C is modulated by varying the bias on the rectifier 99. This is accomplished by employing a modulation source 102 whose signal was coupled through inductor 103 and switch 104. The resulting modulation is indicated by the arrows in curves A, B and C of Fig. 9.

The basic circuit of Fig. 8 may be modified by the addition of the rectifying unit 105 in parallel with the rectifying unit consisting of resistor 97 and rectifier 99 by closing switch 106. With the biasing influence of modulation source 102 removed by opening switch 104, the sine wave voltage is applied in parallel to the rectifier 107 and 99. The rectifier unit 105 includes therein a phase shifting condenser 108 to provide the necessary time displacement between the sine wave signals prior to rectification in recitfiers 99 and 107. This resulting time displacement is indicated in curve D of Fig. 9. The outputs of rectifier 107 and rectifier 99 is coupled in common to inductor 98 which differentiates the rectified waveform of curve D, Fig. 9 to produce the sharp transients as indicated in curve E, Fig. 9. This differentiated waveform is then coupled to a further differentiator circuit 109 which corresponds to the common differentiator 34 of communication system to produce from the signal across inductor 98 the desired marker pulse signals of curve F, Fig. 9.

The sensitivity of this circuit particularly for utilization as a channel modulator may be increased by employing an audio transformer of a step up type in the place of the direct coupling of the modulating source as described in connection with Fig. 4.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse generator comprising a source of sine wave signal, a shape modifying circuit including a time constant circuit and a half-wave rectifier, means coupling the sine wave signal of said source to said shape modifying circuit to produce through the cooperation of said rectifier and said time constant circuit a modified rectified signal having a sharp transition at the trailing edge thereof, and means responsive to said sharp transition to produce from said rectified signal a narrow pulse in time coincidence with said sharp transition.

2. A generator according to claim 1, wherein said time constant circuit includes a resistance-capacitance network.

3. A generator according to claim 2, wherein the capacitance of said network includes a capacitor in shunt relation to the signal of said sine wave source and said half wave rectifier is in shunt relation with said capacitor.

4. A generator according to claim 2, wherein the capacitance of said network includes the circuit capacity of said pulse generator in shunt relation to the signal of said sine wave source and said half wave rectifier is in shunt relation with said circuit capacity.

5. A generator according to claim 2, wherein said half wave rectifier is connected in shunt relation with said sine wave source to be conductive during the decreasing portion of the positive half cycle of the sine wave signal, the conduction of said half wave rectifier rendering the impedance of the capacitance of said network ineffective.

6. A generator according to claim 1, wherein said pulse producing means includes a differentiator circuit responsive to said rectified signal to produce a narrow pulse in time coincidence with said sharp transition.

7. A generator according to claim 6, wherein said differentiator circuit includes a series connected resistance and capacitance coupled in shunt relation to said rectified signal, said narrow pulses being removed therefrom intermediate said resistance and said capacitance.

8. A generator according to claim 6, wherein said differentiator circuit includes an inductance in shunt relation to said rectified signal.

9. A generator according to claim 1, wherein said pulse producing means includes a critically damped tuned circuit in shunt relation to said rectified signal shock excited by said sharp transition for production of said narrow pulse in time coincidence therewith.

10. A generator according to claim 1, wherein said time constant circuit includes a resistance-inductance network.

11. A generator according to claim 10, wherein said half wave rectifier and said resistance-inductance network is in series relation with the current produced by said sine wave source, the output of said circuit being developed across the inductance of said resistance-inductance network.

12. A pulse generator of the double pulse type comprising a source of sine wave signal, a first shape modifying circuit including a time constant circuit having a first given time constant and a half-wave rectifier, a second shape modifying circuit including a time constant circuit having a second given time constant and a half-wave rectifier, means coupling the sine wave signal of said source to said first and second shape modifying circuits in parallel to produce in each of said shape modifying circuits through the cooperation of their respective rectifiers and time constant circuits a modified rectified signal having a sharp transition at the trailing edge thereof, a phase shifting means coupled to one of said shape modifying circuits to provide a phase difference between the modified rectified outputs of said first and second shape modifying circuits, and an output means common to said first and second circuits to product from the modified rectified outputs therefrom narrow pulse signals in time coincidence with the sharp transition of each of the modified rectified outputs.

13. A generator according to claim 12, wherein said means coupling the sine wave signal of said source includes a resistive voltage divider having first and second resistors coupled between said source and a reference potential, the sine wave signal of said source being coupled across said first and second resistances, and said first and said second circuits being coupled to the junction of said first and second resistors.

14. A generator according to claim 12, wherein said phase shifting means includes a condenser.

15. A generator according to claim 12, wherein said first and second given time constants are equal.

16. A time modulated pulse generator comprising a source of sine wave signal, a shape modifying circuit including a time constant circuit and a half-wave rectifier, means coupling the sine wave signal of said source to said shape modifying circuit to produce through the cooperation of said time constant circuit and said rectifier a modified rectified signal having a sharp transition at the trailing edge thereof, a modulating signal source, means coupling the signal of said modulating signal source to said shape modifying circuit to vary the time position of the sharp transition of said rectified signal in accordance with the amplitude of the modulating signal, an output means responsive to said sharp transition to produce from said rectified signal narrow pulse signals in time coincidence with the time varying sharp transitions of said rectified signal.

17. A generator according to claim 16, wherein said modulating signal coupling means includes a low pass filter to prevent interaction between said modulating signal source and said sine wave signal source.

18. A generator according to claim 16, wherein said modulating signal coupling means and said sine wave signal coupling means includes a bridge circuit having first, second, third and fourth apexes, said first and second apexes being opposite one another and said third and fourth apexes being opposite one another, means coupling the signal of said modulating signal source between said third and fourth apexes, means coupling the signal of said sine wave signal source between said first and second apexes, and means coupling the signal present between said second and fourth apexes to said half wave rectifier.

19. A generator according to claim 18, further including means coupled across said second and third apexes to maintain said bridge circuit in balance.

20. In a multichannel communication system, a source of sine wave signal; a synchronizing signal generator; a plurality of signal modulators; a means coupled to said sine wave source to distribute said sine wave signal to said synchronizing signal generator and each of said signal modulators at successive time intervals; a plurality of modulating signal sources; said synchronizing signal generator including a first circuit having a given time constant, said first circuit including a half-wave rectifier, a second circuit having a second given time constant, said second circuit including a half wave rectifier, means coupling the distributed sine wave signal to the rectifiers of said first and second circuits in parallel to produce in each of said circuits in conjunction with the time constant of said circuits a rectified signal having a sharp transition at the trailing edge thereof, and a phase shifting means coupled to one of said circuits to provide a phase difference between the rectified outputs of said first and second circuits; each of said signal modulators including a circuit having a third given time constant, said circuit including a half wave rectifier, means coupling the distributed sine wave signal to the modulator rectifier to produce in conjunction with the time constant of said circuit a rectified signal having a sharp transition at a predetermined time position, and means coupling the signal of said modulating signal sources to the modulator rectifiers to vary the time position of the sharp transition of the modulator output in accordance with the amplitude of the modulating signal; and an output means common to said synchronizing signal generator and each of said signal modulators to produce in time sequence from the rectified outputs therefrom narrow pulse signals in time coincidence with the sharp transition of each of the rectified outputs.

21. A pulse generator comprising a source of sine wave signal, means including a time constant circuit and a half-wave rectifier responsive to the sine wave signal of said source to reshape said sine wave signal to produce a rectified signal having a sharp transition at the trailing edge thereof of substantially steeper slope than the slope of the crossover of said sine wave signal, and means responsive to said sharp transition to produce from said rectified signal a narrow pulse in time coincidence with said sharp transition.

References Cited in the file of this patent

UNITED STATES PATENTS

| | | |
|---|---|---|
| 2,597,038 | Scully | May 20, 1952 |
| 2,629,856 | Gallay | Feb. 24, 1953 |
| 2,645,680 | Reeves | July 14, 1953 |
| 2,732,527 | Emanuelsson | Jan. 24, 1956 |
| 2,831,108 | Barditch | Apr. 15, 1958 |